Patented Feb. 23, 1943

2,311,818

UNITED STATES PATENT OFFICE 2,311,818

METHOD OF MAKING BRUSHES

Charles E. Dawson, Holyoke, Mass., assignor to Pro-phy-lac-tic Brush Company, Northampton, Mass., a corporation of Delaware No Drawing. Application September 6, 1940, Serial No. 355,665

3 Claims. (Cl. 300—21)

My present invention relates to a method of making brushes such as hair, hand, and tooth brushes with backs or handles made from acrylate and similar resins.

Moulding powders made from acrylate resins, for instance, methylmethacrylate, have been employed to some extent as the material for brush backs which are formed by injection moulding. While brushes made with the brush backs so formed have perfect transparency and great brilliance due to the high index of refraction of the material, it has been found that the backs of such brushes disintegrate into a multitude of small fragments when brought into contact momentarily with typical commercial solvents, such as ethyl alcohol which is used in hair tonics, lotions and cosmetics, or carbon tetrachloride and xylol which are found in dry cleaning preparations. For instance, tests which I have made showed that when the back of a brush made from methylmethacrylate moulding powder was wet with a small portion of xylol, small cracks began to appear in about a minute and then the entire back immediately disintegrated into small pieces. A brush treated with ethyl alcohol began to show surface cracks in approximately thirty seconds but did not begin to disintegrate until the end of five minutes. The action of carbon tetrachloride is similar to that of alcohol except that there is less tendency to produce surface cracks but the brush back is very fragile. At first, it was thought that the trouble was caused by swelling of the bristles, but tests on drilled backs which had not been tufted showed that while cracking occurred and the back became fragile, actual disintegration did not take place. While the tendency to crack and disintegrate when contacted by solvents is somewhat observable in brushes, the backs of which have been moulded from acrylate resin sheet stock, it is so serious when the backs are made from moulding powder by the injection moulding process as to make the use of this process and of moulding powder which are otherwise extremely economical and satisfactory, entirely out of the question for the manufacturer of brush backs. When this trouble was first experienced it was believed that the trouble arose from the nature of the moulding powder, and it was thought that it could be overcome by a change in formulation but the manufacturers of the powder were unable to remedy the defect.

I have discovered that the damage to brush backs or other articles made from an acrylate resin when brought in contact with solvents can be prevented by subjecting the article to a suitable heat treatment. The manufacturing operations, such as injection moulding, drilling and tufting to which the article may be subjected produces internal strains which can be observed by examination with polaroid discs or other means for polarizing light. But whether or not the presence of these internal strains is the cause of the difficulty, it has been found that a heat treatment which relieves these strains also prevents the above mentioned damage to the article by solvents.

The heat treatment or stoving cycle suitable for different articles will vary. Thus, the length of time of heating is variable for any given formulation of material depending upon the weights of the articles but must be at least a certain minimum period of time for any given article. This is illustrated in the following table for brushes made by injecting moulding methylmethacrylate moulding powder.

| Brush | No. | Weight | Stoving time | Dimensions | |
|---|---|---|---|---|---|
| | | | | Head | Overall |
| | | Grams | Hours | Inches | Inches |
| Nail brush | 78 | 13.7 | ½ | 1¹³⁄₁₆ × 1 × ⁷⁄₁₆ | 1¹³⁄₁₆ × 1 × ⁷⁄₁₆ |
| Hand | 152 | 39.7 | 1 | 4¼ × 1³⁄₁₆ × ½ | 4¼ × 1³⁄₁₆ × ½ |
| Hair | 158 | 62.0 | 1 | 4 × 1³⁄₁₆ × ½ | 7⅞ × 1³⁄₁₆ × ½ |
| Do | 207 | 63.0 | 1 | 4⅛ × 1³⁄₁₆ × ⁹⁄₁₆ | 8¹⁄₁₆ × 1³⁄₁₆ × ⁹⁄₁₆ |
| Club brush | 295 | 101.2 | 1½ | 3½ × 2³⁄₁₆ × 1¹⁄₁₆ | 6¹¹⁄₁₆ × 2³⁄₁₆ × 1¹⁄₁₆ |
| Complexion | 153 | 35.8 | 1 | 2½ × 1¹³⁄₁₆ × ½ | 3¹⁄₁₆ × 1¹³⁄₁₆ × ½ |
| Military | 603 | 104.5 | 1½ | 4¼ × 2⅜ × 1¹⁄₁₆ | 4¼ × 2⅜ × 1¹⁄₁₆ |
| Hair | 358 | 55.5 | 1 | 4⅛ × 1 × ⁹⁄₁₆ | 8⅛ × 1 × ⁹⁄₁₆ |

The weights in the above table refer to the amount of methacrylate resin present in the brush backs. The brushes requiring a stoving cycle of one hour show a variation in weight of 39.7 to 63.0 grams. However, the brush portion of all of these are of the same general dimensions. The #152 brush is a hand brush of about the same size as the head of the #207 hair brush. The temperature used was 140° F. and should be maintained fairly accurately and, preferably, should not be permitted to vary more than about 1° F. during the stoving cycle. Heating the article a longer period of time does not appear to alter the result obtained. The temperature may be different for different compositions of material and is dependent upon the hardness or softness of the material, being higher the harder the material. In any case, the temperature used should be as high as possible without heat distorting the article. In other words, the temperature should be below, but only slightly below (for example, 5° F.), the thermal distortion or demoulding point of the particular resin used. "Thermal distortion point" and "initial demoulding temperature" mean the range of degrees of temperature over which any given resin or plastic begins to show distortion, and the strains which have been put into the moulded brush back (caused by drilling, inserting and fastening of the bristle tufts) are released or are able to exert themselves as to slightly distort or alter the dimensional shape of the brush back. Any given acrylate resin does not have a sharp melting point, but as it is heated, softens over a range of a number of degrees of temperature. This is a characteristic of plastics; some have long, and others, short ranges of degrees of temperature over which they become softened and the strains incorporated into the brush back or moulded piece are able to release themselves and distort or alter the dimensional shape of the brush back or other moulded piece. The "thermal distortion point" or "initial demoulding temperature"—which mean the same thing—is readily ascertainable by heating and observing the brush back or piece moulded from the acrylate resin in any given case, remembering that the "initial demoulding temperature" or "thermal distortion point" covers a range of a number of degrees, over which the resin softens, and that it does not have a sharp melting point.

The invention is not limited to the manufacture of brush backs but is applicable advantageously to the manufacture of other articles, such as ladies' shoe heels, buttons or ornaments, made from an acrylate resin which, during manufacture, are subjected to operations, such as injection moulding, turning, drilling, nailing or the like. Such articles might come in contact with a commercial solvent and be damaged. For example, buttons or ornaments attached to garments sent to cleaners might contact a commercial solvent.

I claim:

1. The method of making brushes which consists in forming the brush back from acrylate resin, drilling holes in said brush back for the bristle tufts, inserting and fastening the bristle tufts, and then heating the brush for about an hour at a temperature of about 140° F., to relieve the internal strains caused by drilling, inserting and fastening of the bristle tufts.

2. The method of making brushes which consists in forming the brush back from acrylate resin, drilling holes in said brush back for the bristle tufts, inserting and fastening the bristle tufts and then heating the brush for a sufficient time at a temperature slightly below the thermal distortion point of the acrylate resin to relieve the internal strains caused by drilling, inserting and fastening of the bristle tufts.

3. The method of making brushes which consists in forming the brush back from acrylate resin, drilling holes in said brush back for the bristle tufts, inserting and fastening the bristle tufts and then heating the brush for a sufficient time at a temperature approximately 5° F. below the initial demoulding temperature of the resin used, to relieve the internal strains caused by drilling, inserting and fastening of the bristle tufts.

CHARLES E. DAWSON.